(12) United States Patent
Inoue

(10) Patent No.: US 7,600,875 B2
(45) Date of Patent: Oct. 13, 2009

(54) IMAGE DISPLAY APPARATUS, IMAGE DISPLAY METHOD, AND RECORDING MEDIUM

(75) Inventor: Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 547 days.

(21) Appl. No.: 11/353,401

(22) Filed: Feb. 14, 2006

(65) Prior Publication Data

US 2006/0187422 A1    Aug. 24, 2006

(30) Foreign Application Priority Data

Feb. 15, 2005  (JP)  ............................. 2005-038262

(51) Int. Cl.
  *G03B 21/14* (2006.01)
  *H04N 17/02* (2006.01)
(52) U.S. Cl. ............................. 353/69; 35/70; 348/188
(58) Field of Classification Search .................. 353/69, 353/70; 348/747, 188; 345/204
  See application file for complete search history.

(56) References Cited

U.S. PATENT DOCUMENTS

| | | | | |
|---|---|---|---|---|
| 4,533,950 | A * | 8/1985 | Harshbarger | 348/189 |
| 5,760,896 | A * | 6/1998 | Suzuki | 356/3.08 |
| 6,305,805 | B1 * | 10/2001 | Liebenow | 353/69 |
| 6,310,662 | B1 * | 10/2001 | Sunakawa et al. | 348/747 |
| 6,416,186 | B1 * | 7/2002 | Nakamura | 353/69 |
| 6,520,647 | B2 * | 2/2003 | Raskar | 353/70 |
| 6,592,228 | B1 * | 7/2003 | Kawashima et al. | 353/101 |
| 6,886,946 | B2 * | 5/2005 | Eguchi | 353/101 |
| 7,027,188 | B2 * | 4/2006 | Takeuchi et al. | 358/2.1 |
| 7,036,940 | B2 * | 5/2006 | Matsuda et al. | 353/70 |
| 7,055,958 | B2 * | 6/2006 | Tajima | 353/69 |

(Continued)

FOREIGN PATENT DOCUMENTS

JP    05-188282 A    7/1993

(Continued)

OTHER PUBLICATIONS

Japanese Office Action dated Mar. 31, 2009 (7 pages), and English translation thereof (8 pages), issued in counterpart Japanese Application Serial No. 2005-038262.

*Primary Examiner*—William C Dowling
*Assistant Examiner*—Danell L Owens
(74) *Attorney, Agent, or Firm*—Frishauf, Holtz, Goodman & Chick, P.C.

(57) ABSTRACT

In a projector, CPU supplies a chart generation circuit with chart display information designating display position and display size of a chart image to be projected on a screen such that it comes within viewable ranges of phase difference sensors. For focus control, CPU sets display position near center of the screen, and designates display size regardless of distance between the projector and screen. For keystone correction, CPU designates display position and display size based on relationship among angular field of view, distance, and viewable ranges of the phase difference sensors. A superimposing circuit generates a video by superimposing a video signal with a chart image signal based on the chart display information. A display device projects the video superimposed by the superimposing circuit on the screen. CPU obtains the distance to the screen based on phase difference between reflection lights obtained by a sensor unit and corrects the video.

13 Claims, 18 Drawing Sheets

U.S. PATENT DOCUMENTS

| | | | |
|---|---|---|---|
| 7,175,285 B2 * | 2/2007 | Li et al. | 353/70 |
| 7,222,971 B2 * | 5/2007 | Akutsu | 353/69 |
| 7,334,899 B2 * | 2/2008 | Kobayashi | 353/69 |
| 7,399,086 B2 * | 7/2008 | Huewel | 353/69 |
| 7,419,268 B2 * | 9/2008 | Kobayashi | 353/69 |
| 2002/0021418 A1 * | 2/2002 | Raskar | 353/69 |
| 2003/0095239 A1 * | 5/2003 | Hirao et al. | 353/69 |
| 2004/0165154 A1 * | 8/2004 | Kobori et al. | 353/69 |
| 2005/0001986 A1 * | 1/2005 | Matsuda | 353/31 |
| 2005/0018144 A1 * | 1/2005 | Wada et al. | 353/69 |
| 2005/0030523 A1 * | 2/2005 | Inoue | 356/139.1 |
| 2005/0094108 A1 * | 5/2005 | Kobayashi | 353/69 |
| 2005/0237492 A1 * | 10/2005 | Shinozaki | 353/69 |
| 2007/0071430 A1 * | 3/2007 | Iwanaga | 396/114 |

FOREIGN PATENT DOCUMENTS

| | | |
|---|---|---|
| JP | 10-243363 A | 3/1998 |
| JP | 3120526 B2 | 10/2000 |
| JP | 2003-153135 A | 5/2003 |
| JP | 2005-039655 A | 2/2005 |

* cited by examiner

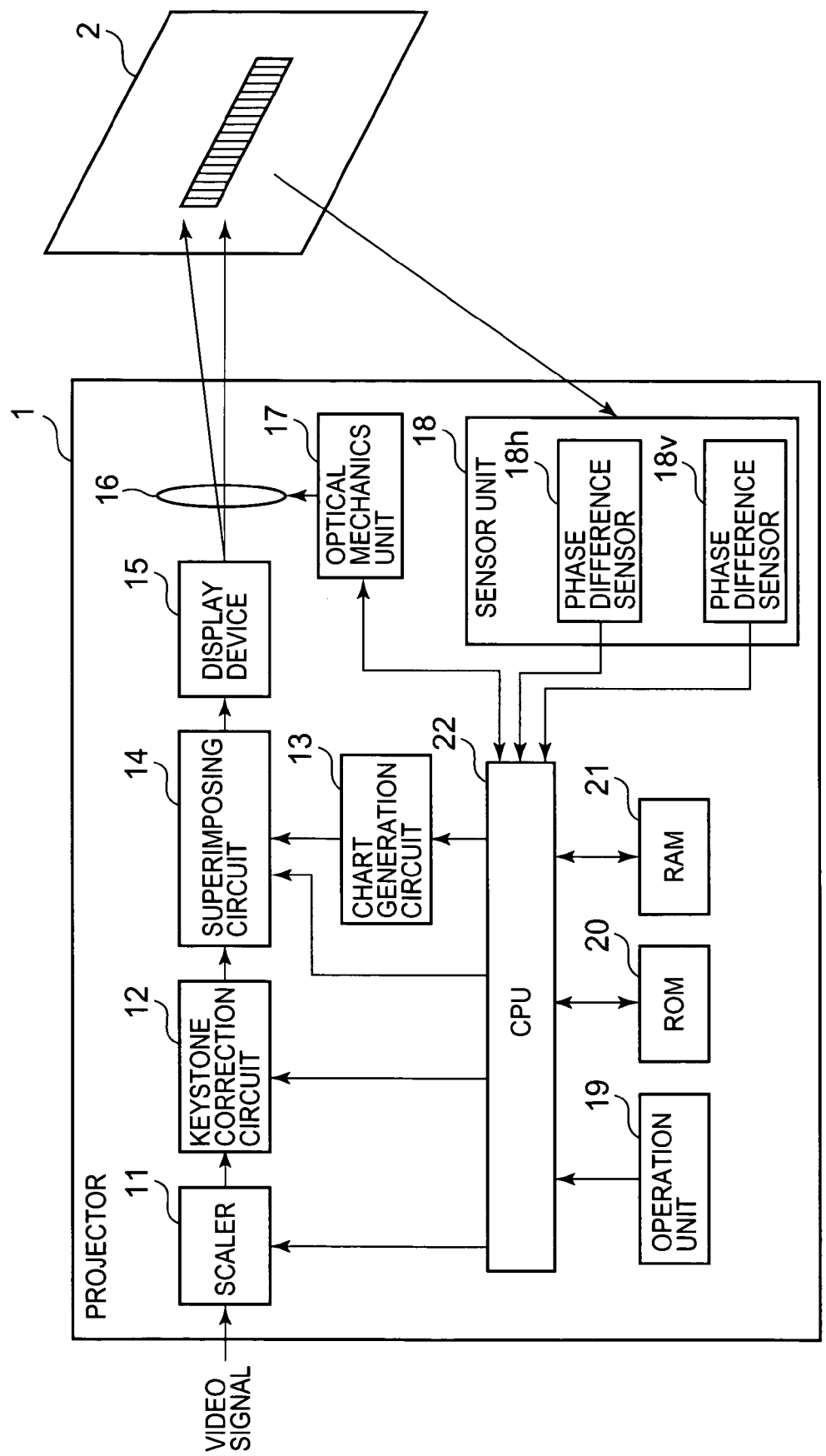

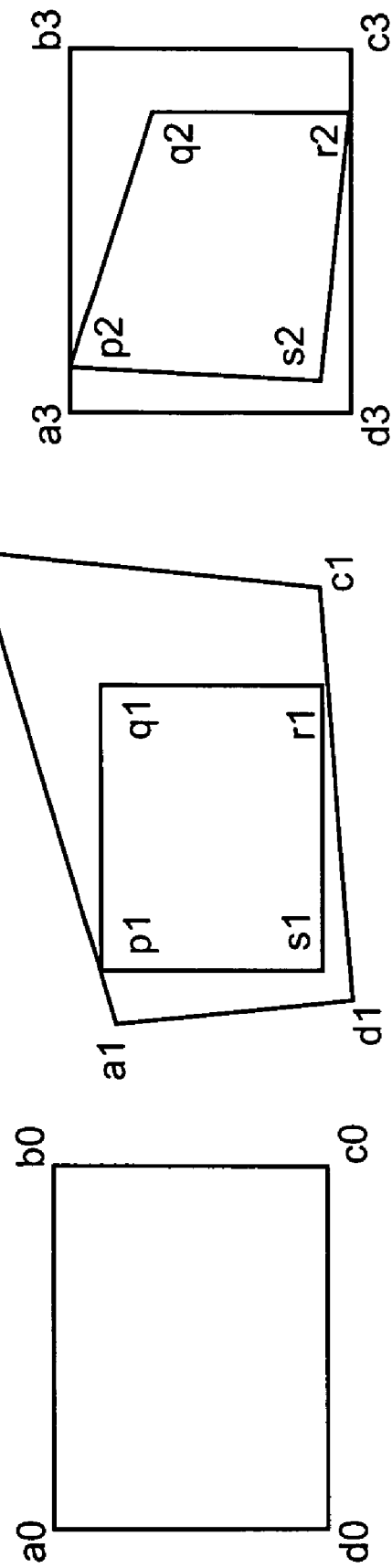

PROJECTOR FRONT ELEVATION

PROJECTOR SIDE ELEVATION

FIG. 9A

TABLE T1

| CHART DISPLAY INFORMATION | FOCUS CONTROL | KEYSTONE CORRECTION |
|---|---|---|
| NECESSITY OR UNNECESSITY OF CHART IMAGE | NECESSARY | NECESSARY |
| TYPE OF CHART IMAGE | Ho | Hc & Vc |
| DISPLAY POSITION | Sp_c | SEE T2 AND T3 |
| DISPLAY SIZE | u1 x w1 | SEE T2 AND T3 |

FIG. 9B

TABLE T2

| ANGULAR FIELD OF VIEW | HORIZONTAL CHART IMAGE Hc | | VERTICAL CHART IMAGE Vc | |
|---|---|---|---|---|
| | DISPLAY POSITION | DISPLAY SIZE | DISPLAY POSITION | DISPLAY SIZE |
| $\alpha\_wide$ | x (1,1+q1) | x (1−s1) | x (1,1+q1) | x (1−s1) |
| $\alpha\_mid$ | x 1 | x 1 | x 1 | x 1 |
| $\alpha\_tele$ | x (1,1−q2) | x (1+s2) | x (1,1−q2) | x (1+s2) |

FIG. 9C

TABLE T3

| ANGULAR FIELD OF VIEW | HORIZONTAL CHART IMAGE Hc | | VERTICAL CHART IMAGE Vc | |
|---|---|---|---|---|
| | DISPLAY POSITION | DISPLAY SIZE | DISPLAY POSITION | DISPLAY SIZE |
| L_near | x (1−p4,1−q4) | x 1 | x (1−p6,1−q6) | x 1 |
| L_mid | x (1−p3,1−q3) | x 1 | x (1−p5,1−q5) | x 1 |
| L_long | x 1 | x 1 | x 1 | x 1 |

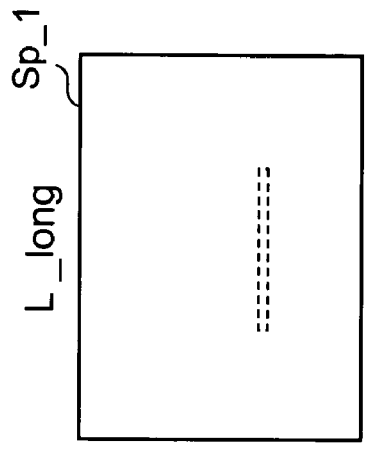
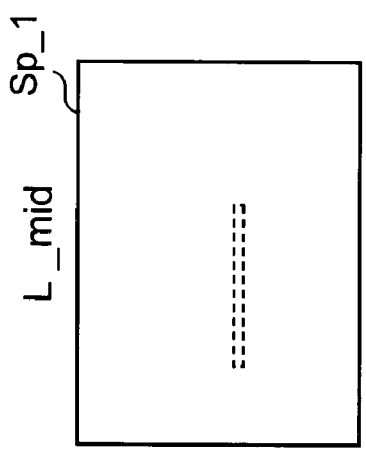
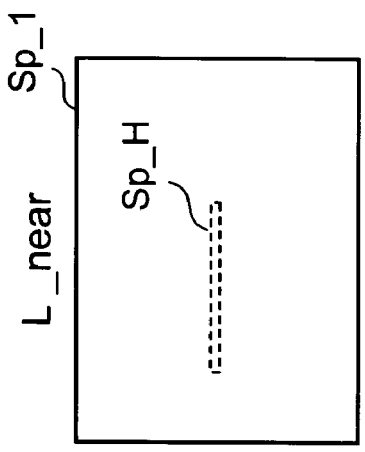
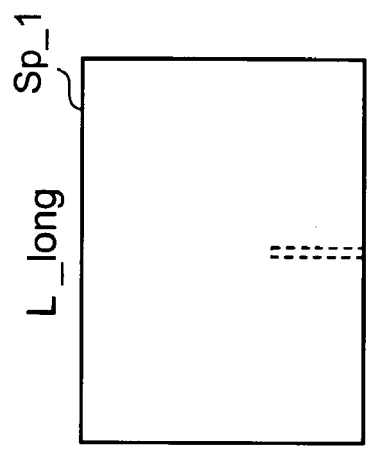
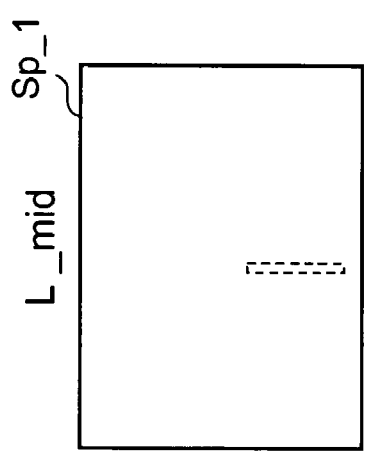
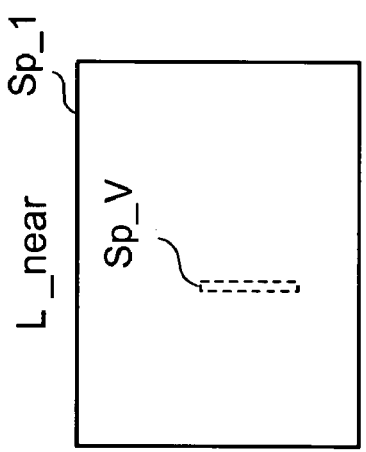

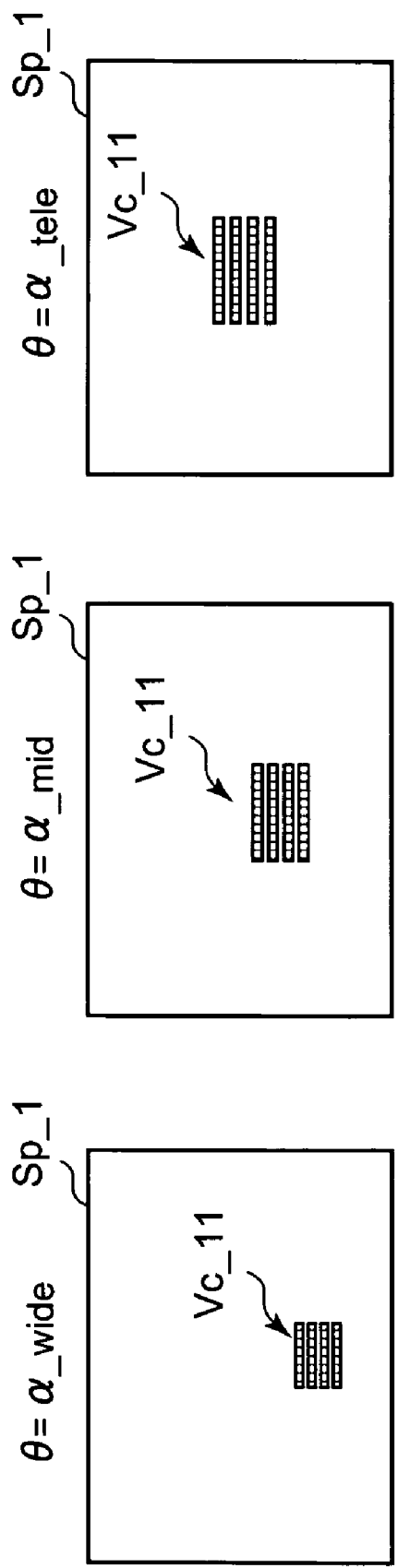

IMAGE DISPLAY APPARATUS, IMAGE DISPLAY METHOD, AND RECORDING MEDIUM

BACKGROUND OF THE INVENTION

1. Field of the Invention

The present invention relates to an image display apparatus, an image display method, and a program for projecting an image on a screen.

2. Description of the Related Art

Projectors project images on a screen. For example, the publication of Japanese Patent No. 3120526 (page 2-3, FIG. 4, FIG. 5) discloses a projector which combines an input video with a different image such as characters, figures, etc. and projects the combined video on a screen.

Further, another projector measures the distance to the screen to achieve the right focus in order to project a vivid video on the screen. As this kind of projector, Unexamined Japanese Patent Application KOKAI Publication No. 2003-153135 (page 3, FIG. 5) discloses one that comprises a passive auto focus unit (AF unit). This AF unit comprises a phase difference sensor that has two line sensors.

This projector projects a chart image for distance measurement purpose on the screen, and the phase difference sensor receives the light from this image so that the distance to the screen may be measured based on the phase difference of the chart image obtained by the phase difference sensor.

By combining this chart image on an input video, the projector can project a vivid video on the screen by controlling the focus at predetermined time intervals or when the distance to the screen changes due to shakes.

However, if such a chart image is overlaid on the video intended to be viewed, viewers get a strange feeling and the video may be unclear.

Therefore, it is desirable that this chart image be displayed in as small a size as possible.

SUMMARY OF THE INVENTION

The present invention was made in consideration of this conventional problem, and an object of the present invention is to provide an image display apparatus and an image display method capable of displaying a chart image in a small size, and a recording medium.

An image display apparatus as a preferred embodiment of the present invention is an image display apparatus for projecting a video on a projection plane, comprising:

a chart image signal generation unit which is supplied with chart display information designating a display position and a display size, on the projection plane, of a chart image for measuring a distance to the projection plane, and which generates a chart image signal in which the display position and the display size of the chart image are set based on the supplied chart display information;

a projection unit which converts the chart image signal generated by the chart image signal generation unit into projection light to project the chart image as a part of a projection video on the projection plane based on the display position and the display size designated by the chart display information supplied to the chart image signal generation unit;

a sensor unit which receives light from the chart image projected as part of the projection video on the projection plane, and which obtains sensor data regarding the distance to the projection plane based on an image imaged on an imaging surface thereof; and a chart display information supply unit which determines a viewable range of the sensor unit, sets the display position and the display size of the chart image on the projection plane based on the determined viewable range of the sensor unit, and supplies the chart display information designating the set display position and display size to the chart image signal generation unit.

An image display method as another preferred embodiment of the present invention is a method of displaying a chart image to be projected for measuring a distance to a projection plane on which a projection video is projected, comprising:

determining a viewable range of a sensor unit which receives light from the projection plane for measuring the distance to the projection plane;

setting a display position and a display size of the chart image so that the chart image comes within the determined viewable range; and projecting the chart image as a part of the projection video on the projection plane based on the set display position and the set display size.

A recording medium as yet another preferred embodiment of the present invention stores a program for controlling a computer to execute functions comprising:

determining a viewable range of a sensor unit which receives light from a projection plane for measuring a distance to the projection plane on which a projection video is projected;

setting a display position and a display size of a chart image to be projected for measuring the distance to the projection plane, so that the chart image comes within the determined viewable range; and projecting the chart image as a part of the projection video on the projection plane based on the set display position and the set display size.

According to the present invention, it is possible to display a chart image in an appropriate size.

BRIEF DESCRIPTION OF THE DRAWINGS

These objects and other objects and advantages of the present invention will become more apparent upon reading of the following detailed description and the accompanying drawings in which:

FIG. 1 is a block diagram showing the configuration of a projector according to one embodiment of the present invention;

FIG. 2A to FIG. 2C are diagrams showing the operation of a keystone correction circuit, where FIG. 2A shows an input video, FIG. 2B shows a projected video, and FIG. 2C shows an inversely transformed video;

FIG. 3A shows a horizontal chart image and FIG. 3B shows a vertical chart image;

FIG. 8A is the front elevation of the projector and FIG. 8B is side elevation of the projector;

FIG. 9A, FIG. 9B, and FIG. 9C are diagrams showing examples of contents of tables stored in a ROM;

FIG. 11A to FIG. 11F are diagrams showing the relationships between the distance to a screen and the viewable ranges of the phase difference sensors;

FIG. 16A shows an example of a horizontal chart image for keystone correction and FIG. 16B shows an example of a vertical chart image for keystone correction;

FIG. 19A, FIG. 19B, and FIG. 19C are diagrams showing the relationships between the angular field of view, and the display position and display size, in a case where the vertical chart image shown in FIG. 18 is used.

DETAILED DESCRIPTION OF THE PREFERRED EMBODIMENT

Figure 3A:
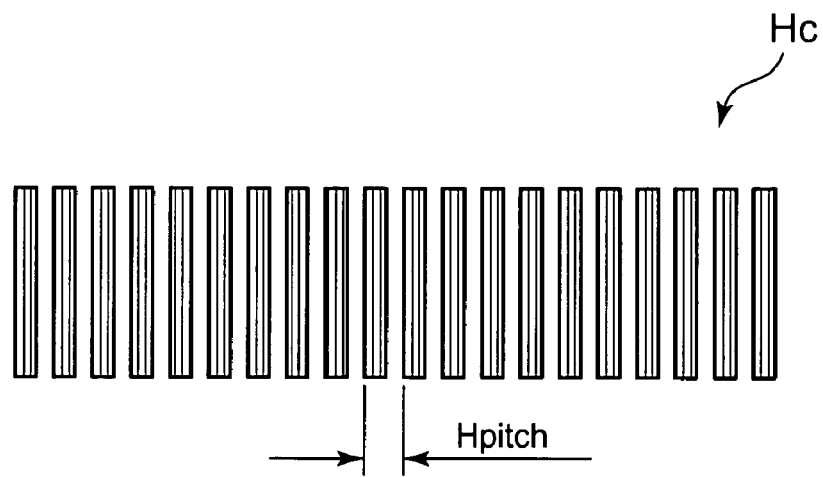
FIG. 3A and FIG. 3B are diagrams showing chart images generated by a chart generation circuit, where

An image display apparatus according to one embodiment of the present invention will now be explained with reference to the drawings. In the following explanation, the image display apparatus will be referred to as "projector".

The configuration of the projector according to the present embodiment is shown in FIG. 1.

The projector 1 according to the present embodiment comprises a scaler 11, a keystone correction circuit 12, a chart generation circuit 13, a superimposing circuit 14, a display device 15, a projection lens 16, an optical mechanics unit 17, a sensor unit 18, an operation unit 19, a ROM (Read-Only Memory) 20, a RAM (Random Access Memory) 21, and a CPU (Central Processing Unit) 22.

The scaler 11 scales an input video signal.

The keystone correction circuit 12 performs keystone correction on the video signal scaled by the scaler 11.

The keystone correction circuit 12 performs keystone correction in the following manner. For example, assume that the keystone correction circuit 12 is supplied with a video having a shape of a quadrangle (hereinafter referred to as quadrangle [a0, b0, c0, d0] which is enclosed by four points a0, b0, c0, and d0, as shown in FIG. 2A. And assume that a video projected on a screen 2 as a projection plane, without being corrected by the keystone correction circuit 12 is a quadrangle [a1, b1, c1, d1] as shown in FIG. 2B, which is due to the inclination of the screen 2.

The keystone correction circuit 12 cuts an inscribed quadrangle [p1, q1, r1, s1] out of the quadrangle [a1, b1, c1, d1]. The keystone correction circuit 12 inversely transforms the cut-out quadrangle [p1, q1, r1, s1] to generate a quadrangle [p2, q2, r2, s2] as shown in FIG. 2C, which shows the inversely-transformed video. This inversely-transformed quadrangle [p2, q2, r2, s2] is projected on the screen, forming an undistorted projection video on the screen 2.

The keystone correction circuit 12 receives information regarding angles of inclination θh and θv from the CPU 22, and performs the above-described keystone correction using the information. The angle of inclination θh is an angle of inclination of the screen 2 with respect to the axis of the projection light projected from the projector 1 in the horizontal direction, whereas the angle of inclination θv is an angle of inclination of the screen 2 in the vertical direction.

Figure 3B:
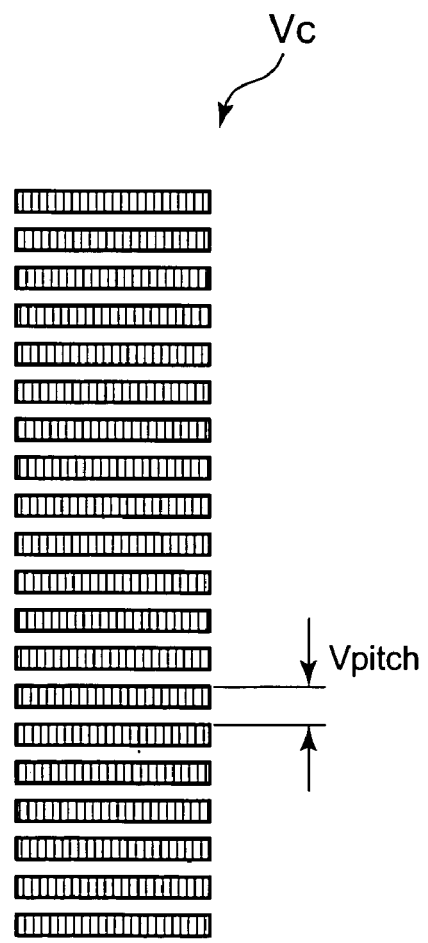

The chart generation circuit 13 generates chart image signals representing a horizontal chart Hc and a vertical chart Vc. In the following explanation, the figures to serve as a reference used for performing focus control to be described later and keystone correction will be referred to as "chart". The horizontal chart image Hc and vertical chart image Vc are both projected on the screen 2 for measuring the distance to the screen 2. For example, the horizontal chart image Hc is a white and black pattern having a pitch Hpitch as shown in FIG. 3A. The vertical chart image Vc is a white and black pattern having a pitch Vpitch as shown in FIG. 3B. The chart generation circuit 13 pre-stores data representing the horizontal chart image Hc and vertical chart image Vc.

The chart generation circuit 13 generates chart images for focus control or keystone correction, when supplied with chart display information from the CPU 22. The chart display information designates necessity or unnecessity of displaying a chart image, type, display position, display size, etc.

Necessity or unnecessity of displaying a chart image designates whether or not to display a chart image. Type designates whether the chart image to be projected is a horizontal chart image Hc or a vertical chart image Vc. Display position designates the position on the screen 2 at which the chart image should be displayed. Display size designates the size of display of the chart image to be projected. The chart display information will be described in detail later.

In a case where the chart display information designates necessity of displaying a chart image, the chart generation circuit 13 selects at least one of the horizontal chart image Hc and vertical chart image Vc based on the supplied chart display information. The chart generation circuit 13 generates a chart image signal carrying a display position and display size as set based on the chart display information supplied from the CPU 22. The chart generation circuit 13 outputs the generated chart image signal to the superimposing circuit 14.

The superimposing circuit 14 superimposes a video signal input from the keystone correction circuit 12 with the chart image signal generated by the chart generation circuit 13, and supplies the superimposed video signal to the display device 15.

The display device 15 comprises a spatial light modulator or the like, to convert the video signal generated by the superimposing circuit 14 into a projection light and project the converted video onto the screen 2. The display device 15 projects the horizontal chart image Hc and vertical chart image Vc included in the supplied video signal on the screen 2 at the display position and in the display size as set.

The projection lens 16 images the video obtained by the display device 15 on the screen 2.

The optical mechanics unit 17 controls the position of the projection lens 16 so that the video may be imaged on the screen 2. The optical mechanics unit 17 is supplied with information showing the distance between the projector 1 and the screen 2 from the CPU 22, and controls the position of the projection lens 16 based on this distance information so that the video may be imaged on the screen 2.

Figure 4:
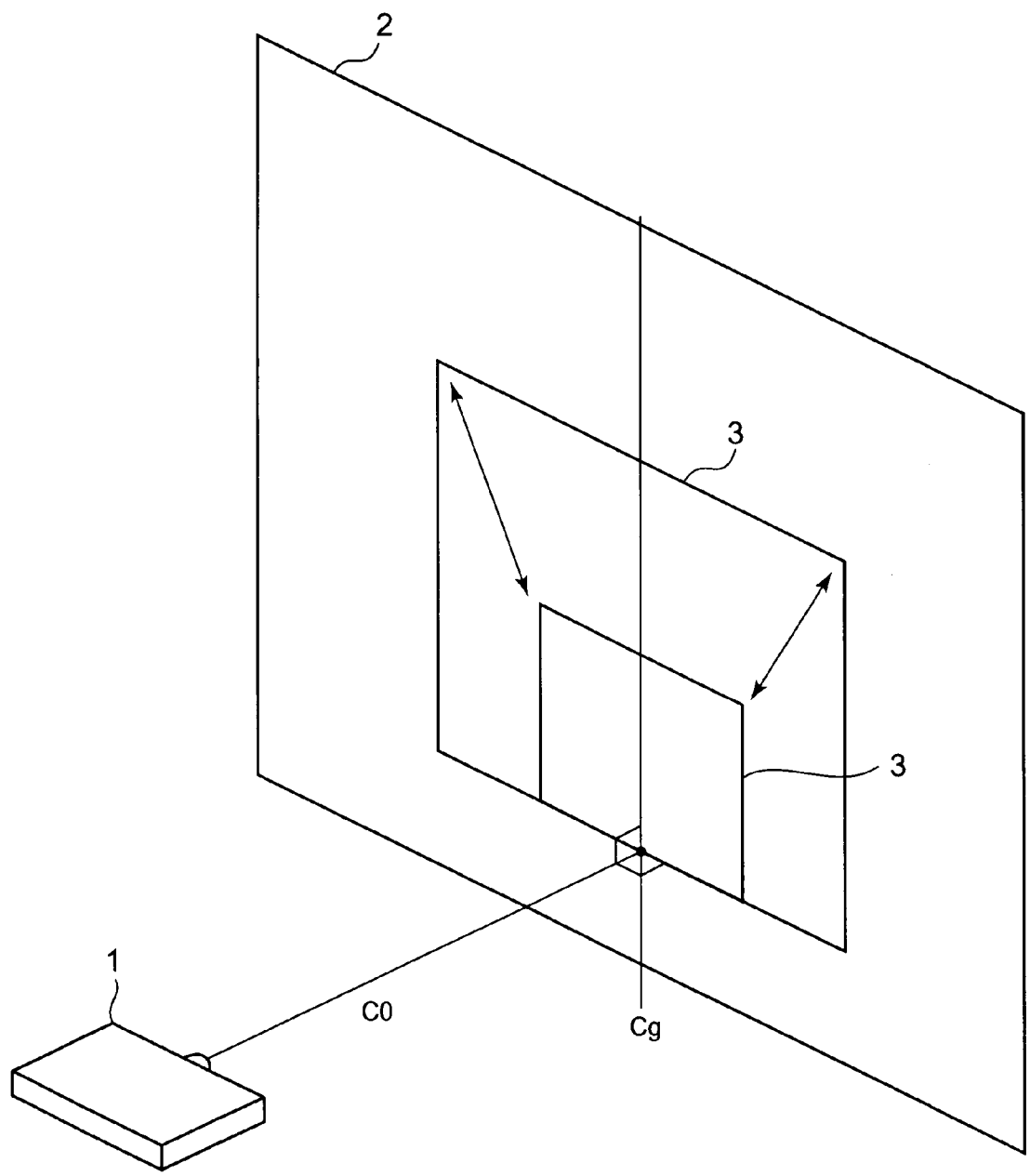
FIG. 4 is a diagram showing the angular field of view of the projector.

The optical mechanics unit 17 also controls the zoom of the video to be projected on the screen 2. The optical mechanics unit 17 controls the zoom in a manner that the light axis C0 of the projector 1 meets the centerline Cg of the bottom line of the projected video 3, as shown in FIG. 4. The angular field of view of the projected video 3 is larger at a wider angle, while being smaller at a narrower angle. The optical mechanics unit 17 outputs information (zoom information) regarding the angular field of view of the projection lens 16 to the CPU 22.

The sensor unit 18 includes a phase difference sensor 18h and a phase difference sensor 18v. The phase difference sensors 18h and 18v receive light emitted from the chart image projected on the screen 2, and obtain phase difference data in the horizontal direction and vertical direction respectively, based on the received light.

Figure 5:
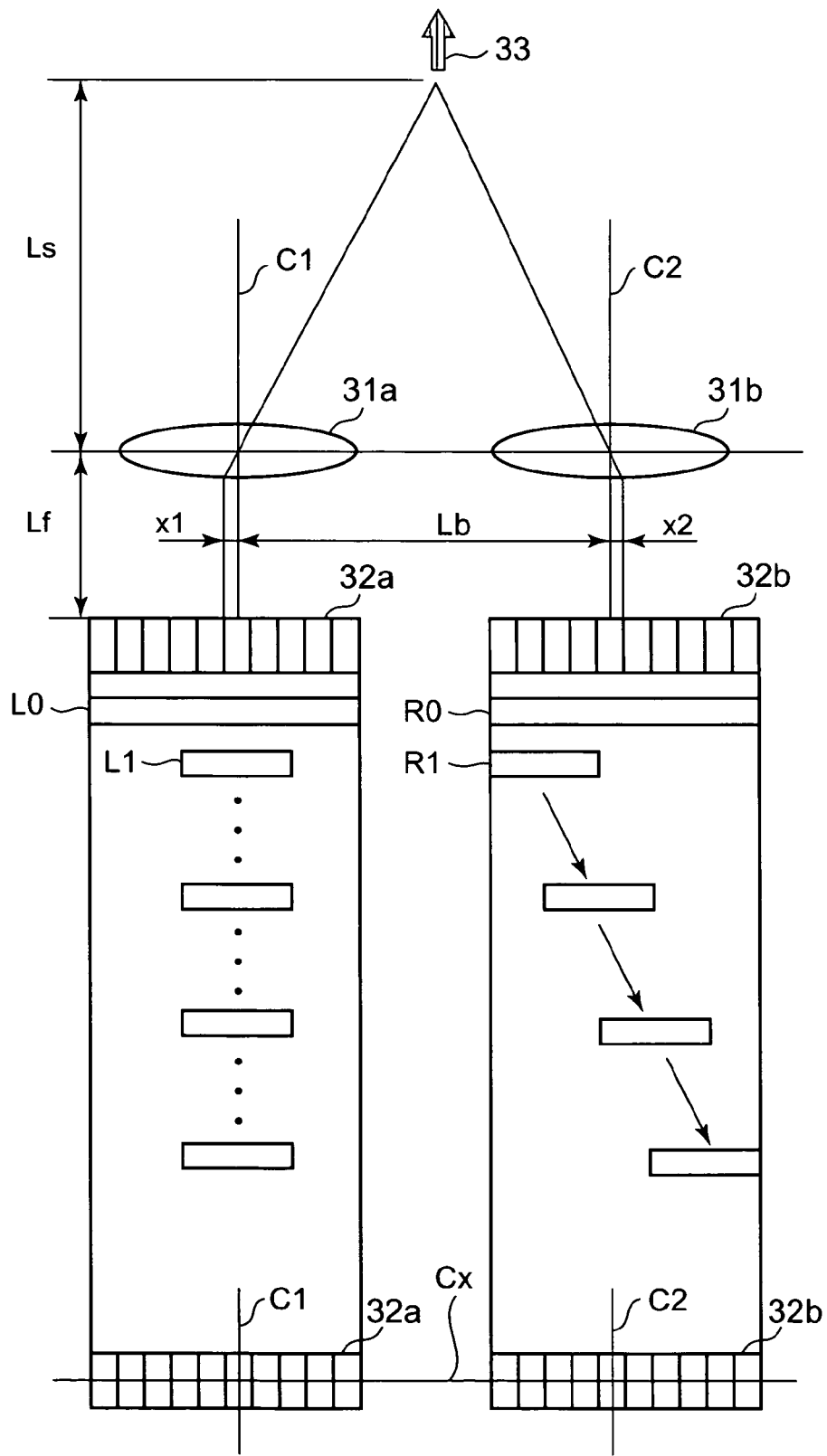
FIG. 5 is a diagram showing an operation performed by a sensor unit to obtain phase difference data.

The phase difference sensors 18h and 18v comprise lenses 31a and 31b and photo sensor arrays 32a and 32b, as shown in FIG. 5.

The lenses 31a and 31b and photo sensor arrays 32a and 32b of the phase difference sensor 18h are arranged in the horizontal direction. The lenses 31a and 31b and photo array sensors 32a and 32b of the phase difference sensor 18v are arranged in the vertical direction.

The lenses 31a and 31b image a photo-object 33 on the detection surfaces of the photo sensor arrays 32a and 32b respectively. The lenses 31a and 31b are disposed apart from each other by an interval Lb. Centerlines C1 and C2 are the central lines of the lenses 31a and 31b respectively. For example, it is possible to say that beams of light emitted from a photo-object 33 located in an optically infinite distance from the lenses 31a and 31b travel the paths of the centerlines Ca and C2 and are approximately parallel with each other.

The photo sensor arrays 32a and 32b detect the image of the photo-object 33 that is imaged on their detection surfaces, and output the detection result in the form of an electric signal. The photo sensor arrays 32a and 32b are respectively constituted by a plurality of photo sensors which are arrayed. The direction of array of the plurality of photo sensors of both arrays 32a and 32b is parallel with the centerlines C1 and C2. The lens 31a and the photo sensor array 32a, and the lens 31b and the photo sensor array 32b are disposed apart from each other by an interval Lf.

Video data streams L0 and R0 representing the video of the photo-object 33 are formed on the photo sensor arrays 32a and 32b, respectively. In a case where the photo-object 33 is located at a position nearer from the lenses 31a and 31b than a position approximate to the optically infinite distance, the video data streams L0 and R0 produce a phase difference (x1+x2) therein.

For example, the phase difference sensors 18h and 18v shift the video data stream R1 on the photo sensor array 32b in a direction perpendicular to the centerlines C1 and C2, and obtain the value of correlation between the video data stream L1 on the photo sensor array 32a and the video data stream R1 on the photo sensor array 32b. Then, the phase difference sensors 18h and 18v obtain the amount of deviation (shift) at which the correlation value is the local maximum, as the phase difference (x1+x2) from the centerlines C1 and C2. The distance Ls between the lenses 31a and 31b and the photo-object 33 is obtained based on the phase difference (x1+x2) and the intervals Lb and Lf.

By using the chart image projected on the screen 2 as the photo-object 3, the phase difference sensors 18h and 18v obtain phase difference data regarding the distance between the projector 1 and the screen 2.

Figure 6A:
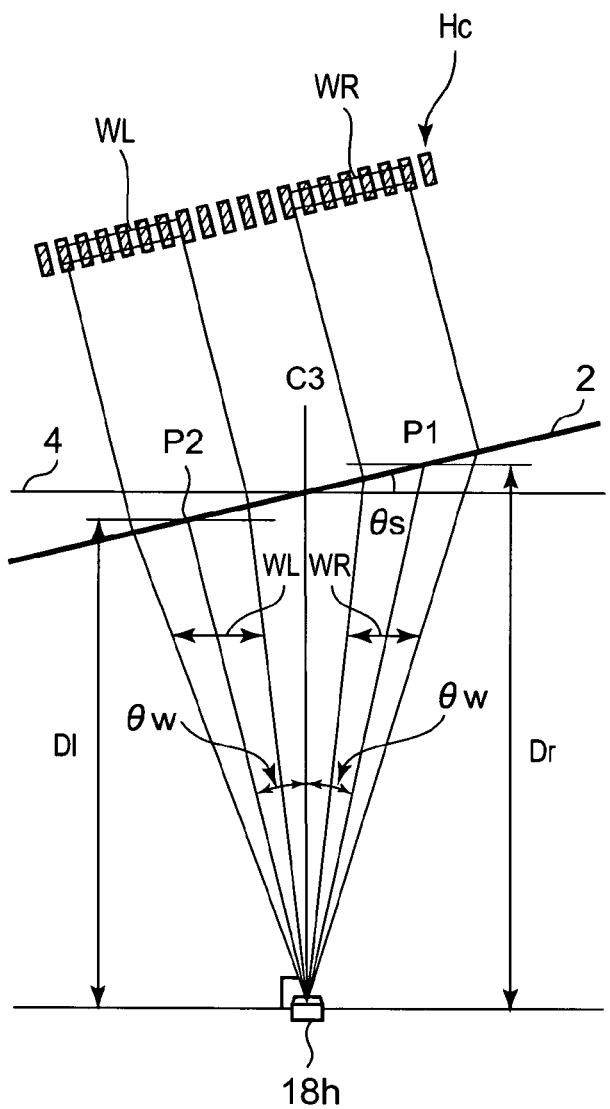
FIG. 6A to FIG. 6C are diagrams showing an operation performed by the sensor unit to obtain phase difference data.

For measuring the angle of inclination θh of the screen 2 in the horizontal direction, the phase difference sensor 18h sets a two distance-measuring windows WR and WL in the horizontal chart image Hc, as shown in FIG. 6A.

A plane 4 in FIG. 6A represents an ideal screen surface which is perpendicular to the light axis (centerline) of the projection light. θs is an angle of inclination of the screen 2 with respect to the ideal screen surface. Dr and Dl represent the distance between the projector 1 and the center points P1 and P2 of the distance-measuring windows WR and WL, respectively. The angle θw represents an angle of view of the projection light as observed from the distance-measuring windows WR and WL.

Figure 6B:
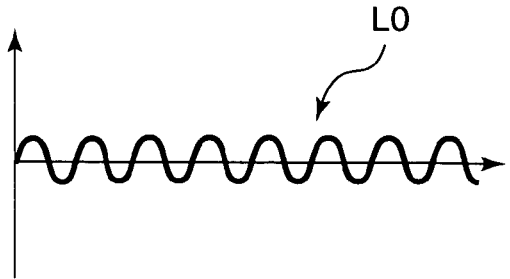
Figure 6C:
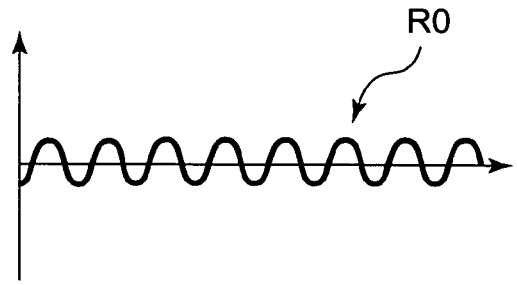

When the chart image is used as the photo-object 33 and the phase difference sensor 18h receives a light reflected on the screen 2 within the distance-measuring window WR, data streams L0 and R0 imaged on the photo sensor arrays 32a and 32b have waveforms as shown in FIG. 6B and FIG. 6C, respectively. The phase difference sensor 18h obtains phase difference data in the horizontal direction corresponding to the distance between the point P1 and the phase difference sensor 18h, based on the data streams L0 and R0.

Likewise, when the phase difference sensor 18h receives a light reflected on the screen 2 within the distance-measuring window WL, video data having waveforms as shown in FIG. 6B and FIG. 6C are imaged on the photo sensor arrays 32a and 32b respectively. The phase difference sensor 18h obtains phase difference data in the horizontal direction corresponding to the distance between the point P2 and the phase difference sensor 18h, based on these video data.

The phase difference sensor 18h supplies the obtained phase difference data to the CPU 22. The phase difference sensor 18v operates in the same way as the phase difference sensor 18h to obtain phase difference data in the vertical direction, and supplies the obtained phase difference data in the vertical direction to the CPU 22.

Figure 7:
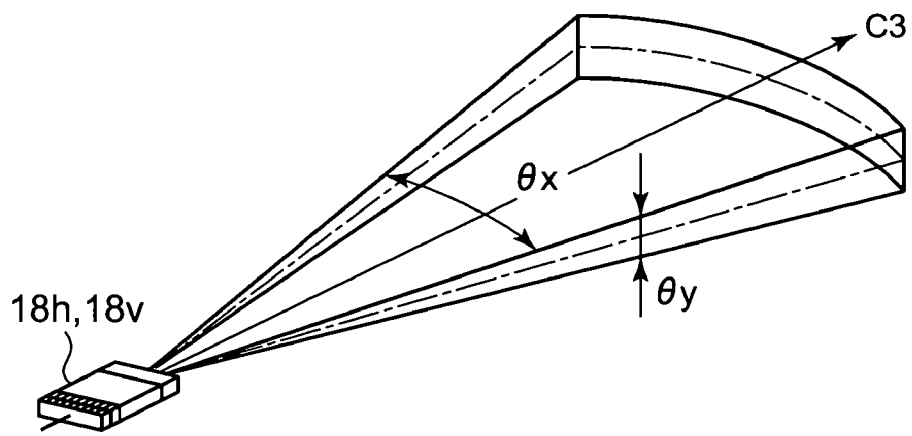
FIG. 7 is a diagram showing the angles of view of phase difference sensors.

The phase difference sensors 18h and 18v have angles of view θx and θy, as shown in FIG. 7. The angle of view θx is an angle of view in the direction of array of the plurality of photo sensors of the photo sensor arrays 32a and 32b, and typically about 12 degrees. The angle of view θy is an angle of view in the direction perpendicular to this direction of array, and typically about 0.6 degree. The phase difference sensors 18h and 18v have these angles of view θx and θy, thus defining their own viewable range within the screen 2. The specific values of the angles of view indicated herein are examples, not limiting the present invention.

Figure 8A:
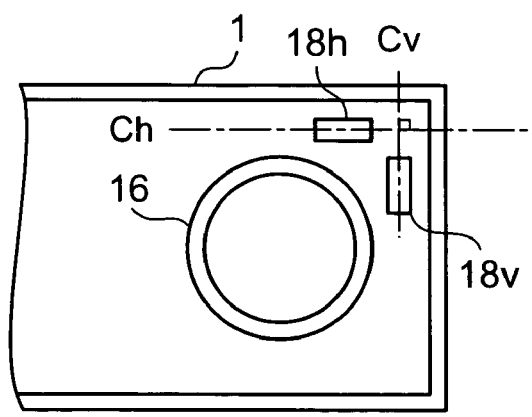
FIG. 8A and FIG. 8B are diagrams showing the projector and the mounting positions of the phase difference sensors, where
Figure 8B:
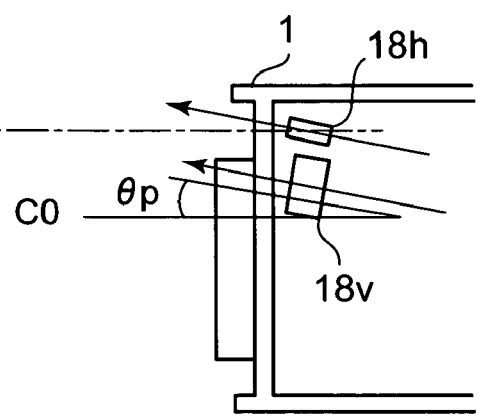

The phase difference sensors 18h and 18v are disposed near the projection lens 16 such that their centerlines Ch and Cv are orthogonal, as shown in FIG. 8A. As shown in FIG. 8B, the angle of elevation of the the phase difference sensors 18h and 18v with respect to the light axis C0 of the projector 1 is assumed to be θp. Note that the angle of elevation θp may take a positive value, a negative value, or 0.

The operation unit 19 is used for operation information such as data, instructions, etc., and comprises ten keys for inputting data, operation keys for instructing auto focus, auto keystone correction, etc., and the like. The operation unit 19 supplies operation information as input, to the CPU 22.

The ROM 20 is a memory storing programs to be executed by, the CPU 22, and table data. The ROM 20 stores data of tables T1, T2 and T3 as shown in, for example, FIG. 9A, FIG. 9B, and FIG. 9C, as the table data. The table T1 stores the chart display information described above. The table T2 stores relationships between angular field of view, and display position and display size. The table T3 stores relationships between projection distance, and display position and display size. The tables will be described in detail later.

The tables T1 to T3 are set in accordance with a preset relationship among the angular field of view of the display device 15, the distance to the screen 2, and the viewable range of the sensor unit 18 in the screen 2.

The phase difference sensors 18h and 18v have the angles of view θx and θy as described above, are disposed near the projection lens 16, and are apart from the light axis C0. Thus, the viewable ranges Sp_H and Sp_V of the phase difference sensors 18h and 18v in a projection area Sp_1 change in accordance with the angular field of view θ, as shown in FIG. 10A to FIG. 10F.

Figure 10A:
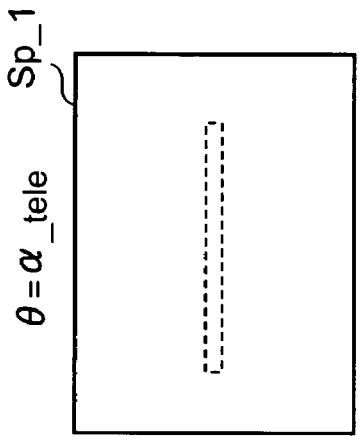
FIG. 10A to FIG. 10F are diagrams showing the relationships between the angular field of view and the viewable ranges of the phase difference sensors.
Figure 10B:
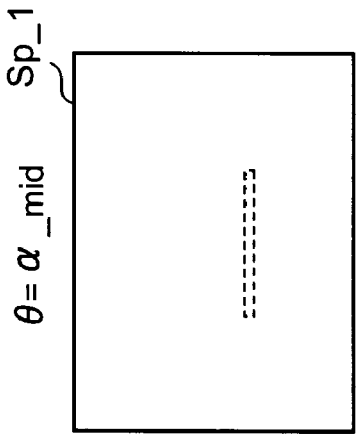
Figure 10C:
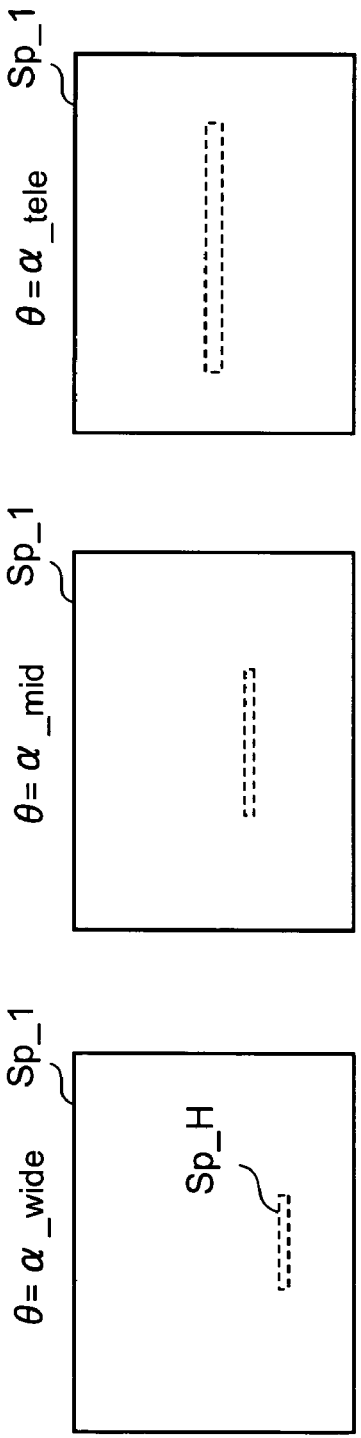
Figure 10D:
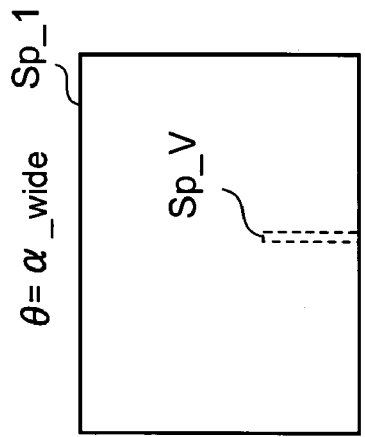
Figure 10E:
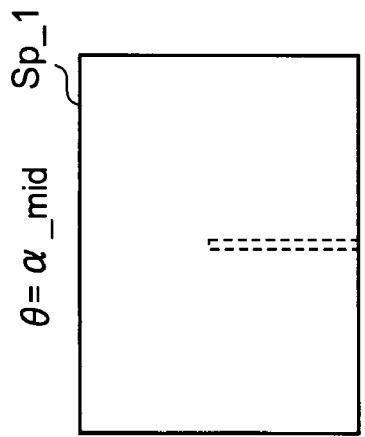
Figure 10F:
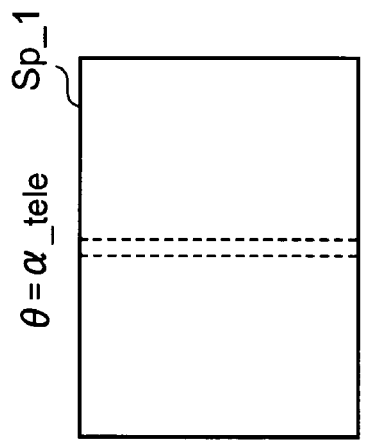

FIG. 10A to FIG. 10C show the viewable range Sp_H of the phase difference sensor 18h in the projection area Sp_1 in case of the angular field of view θ being α_wide (large angular field of view), α_mid (middle angular field of view), and α_tele (small angular field of view), respectively. FIG. 10D to FIG. 10F show the viewable range Sp_V of the phase difference sensor 18v in the projection area Sp_1 in case of the angular field of view θ being α_wide, α_mid, and α_tele, respectively. Assuming that α_tele<α_mid<α_wide, the chart image extends gradually longer in the horizontal direction, in the order of fields of view θ in the horizontal direction of α_wide, α_mid, and α_tele, as shown in FIG. 10A to FIG. 10C. Likewise, the chart image extends gradually longer in the vertical direction, in the order of fields of view θ in the vertical direction of α_wide, α_mid, and α_tele, as shown in FIG. 10D to FIG. 10F. According to the present embodiment, the angular field of view θ is classified into three ranges of angular field of view of α_wide, α_mid, and α_tele.

Further, as shown in FIG. 11A to FIG. 11F, the viewable ranges Sp_H and Sp_V of the phase difference sensors 18h and 18v in the projection area Sp_1 also change due to the distance between the projector 1 and the screen 2.

FIG. 11A to FIG. 11C show the viewable range Sp_H of the phase difference sensor 18h in the projection area Sp_1 in case of the distance between the projector 1 and the screen 2 being a near distance L_near, a middle distance L_mid, and a far distance L_long, respectively. FIG. 11D to FIG. F show the viewable range Sp_V of the phase difference sensor 18v in the projection area Sp_1 in case of the distance between the projector 1 and the screen 2 being the near distance L_near, the middle distance L_mid, and the far distance L_long, respectively. According to the present embodiment, the distance between the projector 1 and the screen 2 is classified into three ranges of distance of near distance L_near, middle distance L_mid, and far distance L_long.

The tables T1 to T3 are preset in a manner that the viewable range of the sensor unit 18 meets the display position and display size of the chart image generated by the chart generation circuit 13.

The table T1 is a table showing the chart display information. As shown in FIG. 9A, as to the necessity or unnecessity of displaying a chart image, "necessary" is set for both focus control and keystone correction.

Focus control can be performed if the distance between the projector 1 and the center point of the screen 2 is obtained. Therefore, either one of the horizontal chart image Hc and the vertical chart image Vc is used. According to the present embodiment, the horizontal chart image Hc is used.

Figure 12:
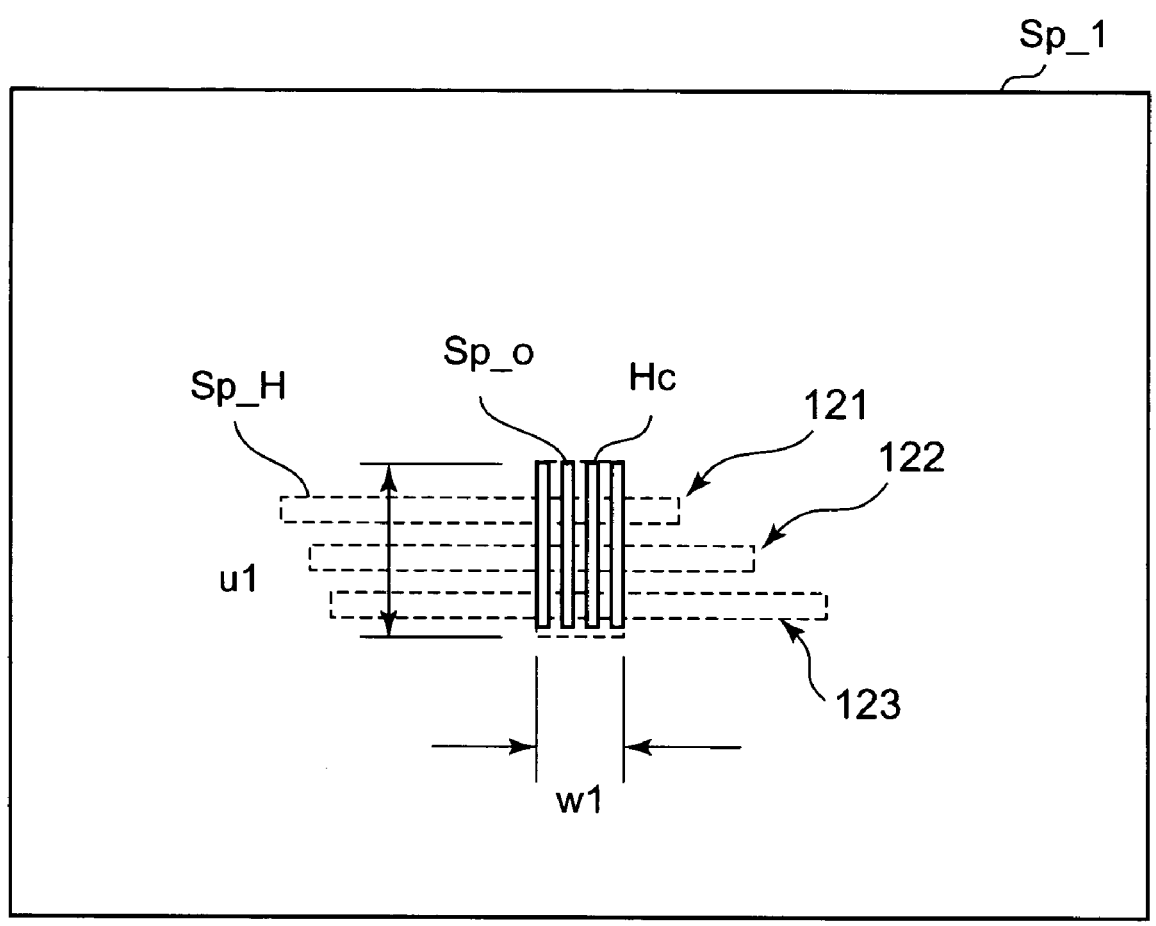
FIG. 12 is a diagrams showing the relationship between the viewable range of the phase difference sensor, and the display position and display size of the horizontal chart image, in a case where the horizontal chart image is employed as the chart image for focus control.

For focus control, the display position is set at the center area Sp_c including the center of the projection area Sp_1, as shown in FIG. 12. The display size is set to a predetermined value u1×w1, regardless of the distance to the screen 2. The display size is set based on the viewable ranges of the sensor unit 18.

The display position and display size for focus control are set so, because the distance between the projector 1 and the screen 2 that should be obtained is unknown beforehand. These settings are also because it is necessary to make the horizontal chart image Hc come within the viewable ranges Sp_H and Sp_V when it is projected, even when the viewable ranges Sp_H and Sp_V of the phase difference sensors 18h and 18v change in accordance with the distance between the projector 1 and the screen 2.

For performing keystone correction, both the horizontal chart image Hc and the vertical chart image Vc are used, as shown in the table T1 of FIG. 9A. The display position and display size are set based on the tables T2 and T3.

The reason both the horizontal chart image Hc and the vertical chart image Vc are used is that it is necessary to measure the distance to two points on the screen 2 in the horizontal and vertical directions in order to obtain the angles of inclination θh and θv of the screen 2.

The table T2 shown in FIG. 9B stores data showing relationships between the angular field of view of the display device 15, and the display position and display size of the horizontal chart image Hc and vertical chart image Vc in the projection area Sp_1. The table T2 is preset based on the angular field of view and the viewable ranges Sp_H and Sp_V of the phase difference sensors 18h and 18v in the projection area Sp_1.

In the table T2, the display positions of the horizontal chart image Hc and vertical chart image Vc in case of the angular field of view θ being α_mid are referred to as reference (=1). The value in each cell of the table in case of the angular field of view θ being α_wide and α_tele indicates the magnification ratio of the display position or display size of the horizontal chart image Hc and vertical chart image Vc with respect to the reference display position or reference display size. pppppp For example, assume that the coordinates of the center point of the reference display position of the horizontal chart image Hc in the projection area Sp_1 in case of the angular field of view θ being α_mid are (p0, q0). The table T2 suggests that the coordinates of the center point of the display position of the horizontal chart image Hc in case of the angular field of view θ being α_wide are expressed by (p0, q0×(1+q1)).

The table T3 shown in FIG. 9C shows the relationships between the distance between the projector 1 and the screen 2, and the display position and display size of the horizontal chart image Hc and vertical chart image Vc in the projection area Sp_1. The table T3 is preset based on the distance to the screen 2, and the viewable ranges Sp_H and Sp_V of the phase difference sensors 18h and 18v in the projection area Sp_1.

In the table T3, the display positions of the horizontal chart image Hc and vertical chart image Vc in case of the distance between the projector 1 and the screen 2 being L_long (far distance) are referred to as reference (=1). The value in each cell of the table T3 in case of the distance being L_near (near distance) and L_mid (middle distance) indicates the magnification ratio of the display position or display size of the horizontal chart image Hc and vertical chart image Vc with respect to the reference display position or reference display size.

For example, assume that the coordinates of the center point of the reference display position of the horizontal chart image Hc in the projection area Sp_1 in case of the distance being L_long are (p0, q0). The table T3 suggests that the coordinates of the center point of the display position of the horizontal chart image Hc in case of the distance being L_near are (p0×(1−p4), q0×(1−q4)).

The projector 1 has various individual variations. The individual variations includes one due to the shifts of the light axis caused by the assembling error of the projection lens 16, etc., one due to the difference of the direction of the sensor view caused by the mounting error of the phase difference sensors 18$h$ and 18$v$, and one in the angular field of view information output by the optical mechanics unit 17.

Even with these individual variations, the data in the tables T1 to T3 are set so that the display position and display size of the chart image may meet the viewable ranges of the phase difference sensors 18$h$ and 18$v$, with errors of the viewable ranges of the phase difference sensors 18$h$ and 18$v$ due to these individual variations taken into consideration. The individual variations are measured when the projector 1 is manufactured, and values with the errors taken into consideration are set in the tables T1 to T3.

The RAM 21 is a memory that keeps short memories of data necessary for the operation of the CPU 22. The RAM 21 keeps memories of information such as a corrected display position of the chart image, etc., as the data necessary for outputting a corrected video.

The CPU 22 reads programs, etc. from the ROM 20 and controls each unit of the projector 1. Specifically, the CPU 22 performs focus control and keystone correction control, at predetermined time intervals, or when the distance between the projector 1 and the screen 2 changes due to shakes, or when the user gives an instruction for such control by operating the operation unit 19.

In the focus control, the CPU 22 sets chart display information for the focus control, by referring to the table T1 stored in the ROM 20. That is, the CPU 22 sets "necessary" as to the necessity or unnecessity of displaying a chart image. The CPU 22 employs the phase difference sensor 18$h$ in the horizontal direction as the sensor for acquiring phase difference data, and the horizontal chart image Hc. The CPU 22 sets the display position to Sp_c, and the display size to u1×w1. The CPU 22 supplies the chart display information designating these set data to the chart generation circuit 13.

The CPU 22 determines whether the chart images come within the viewable ranges of the phase difference sensors 18$h$ and 18$v$. For example, the CPU 22 has the wave height values of the data streams L0 and R0 shown in FIG. 6B and FIG. 6C as the thresholds, and determines that the chart images come within the viewable ranges of the phase difference sensors 18$h$ and 18$v$ in a case where the wave heights of data streams L0 and R0 exceed the thresholds.

In a case where determining that the chart images do not come within the viewable ranges of the phase difference sensors 18$h$ and 18$v$, the CPU 22 corrects the chart display information, and supplies the corrected chart display information to the chart generation circuit 13.

When the CPU 22 obtains phase difference data from the sensor unit 18, it calculates the distance between the projector 1 and the screen 2 based on the phase difference (x1+x2) and the intervals Lb and Lf shown in FIG. 5A, as described above. Then, the CPU 22 supplies this distance information to the optical mechanics unit 17.

In the keystone correction, the CPU 22 sets chart display information for the keystone correction, with reference to the tables T1 to T3 stored in the ROM 20. That is, the CPU 22 sets "necessary" as to the necessity or unnecessity of displaying a chart image by referring to the table T1, employs both the phase difference sensor 18$h$ and the phase difference sensor 18$v$ as the sensors for obtaining the phase difference data, and uses both the horizontal chart image Hc and the vertical chart image Vc.

The CPU 22 obtains angular field of view information from the optical mechanics unit 17, and sets the display position and display size of the horizontal chart image Hc and vertical chart image Vc by referring to the table T2 stored in the ROM 20 based on the obtained angular field of view information.

Further, the CPU 22 refers to the table T3 stored in the ROM 20, and sets the display position and display size of the horizontal chart image Hc and vertical chart image Vc based on the distance information already obtained at the time of the focus control.

The CPU 22 supplies the chart display information as set for the keystone correction, to the chart generation circuit 13.

The CPU 22 determines whether the areas where the chart images are projected meet the viewable ranges of the phase difference sensors 18$h$ and 18$v$, likewise when focus control. In a case where determining that they meet, the CPU 22 calculates the distance between the projector 1 and the screen 2 in the horizontal direction and vertical direction, based on the phase difference data obtained from the sensor unit 18.

Then, the CPU 22 obtains the angles of inclination θh and θv of the screen 2 based on the calculated distance in the horizontal direction and vertical direction. The CPU 22 supplies the information on these angles of inclination θh and θv to the keystone correction circuit 12 to control the keystone correction circuit 12 to perform keystone correction.

Next, the operation of the projector 1 according to the present embodiment will be explained.

The scaler 11 scales an input video signal. The keystone correction circuit 12 does not perform the keystone correction unless it is supplied with the angles of inclination θh and θv from the CPU 22, so outputs the video signal scaled by the scaler 11 to the superimposing circuit 14.

First, the focus control process will be explained.

The CPU 22 performs focus control at predetermined time intervals, or when the distance to the screen 2 changes due to shakes, etc., or when the user gives an instruction by operating the operation unit 19.

Figure 13:
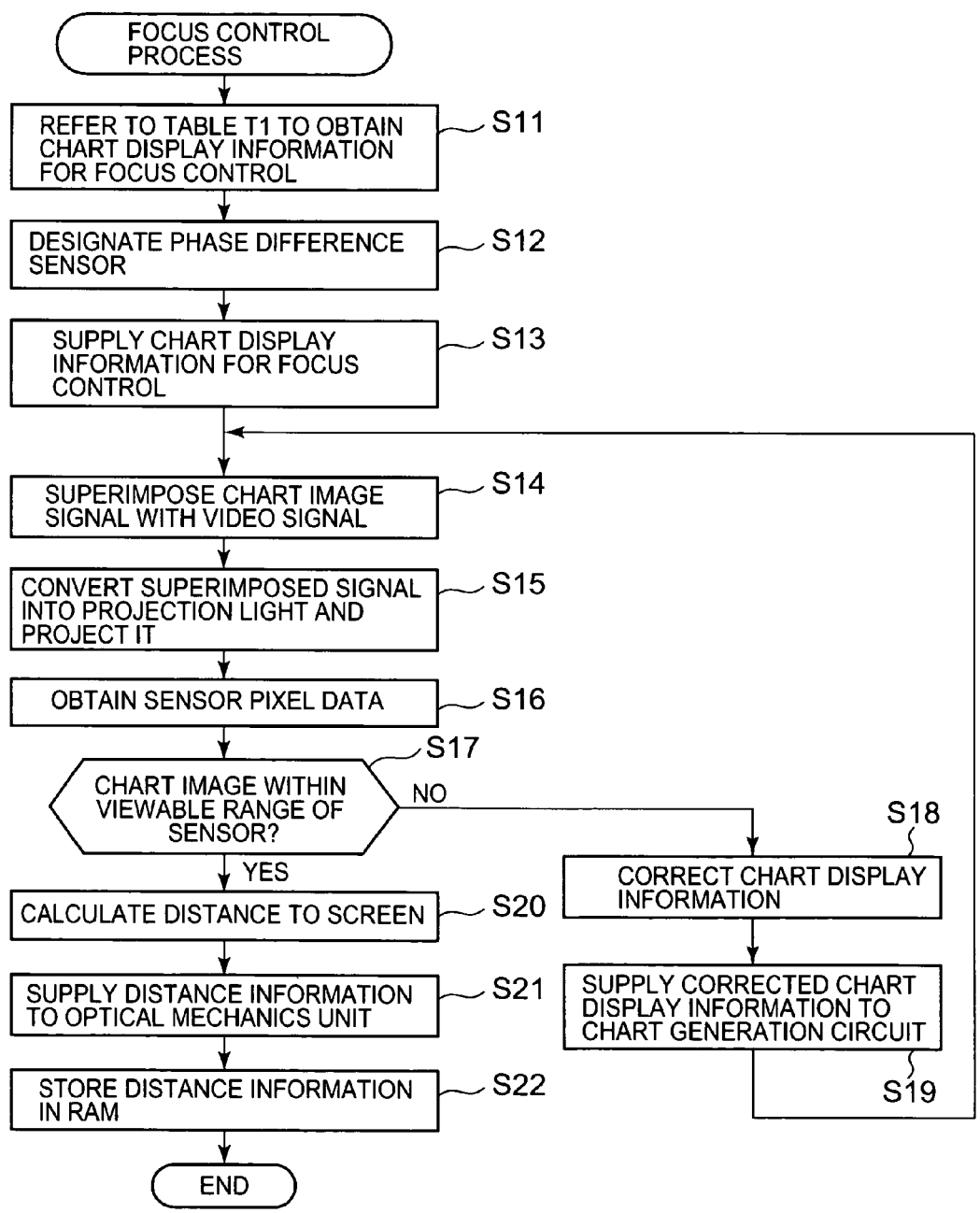
FIG. 13 is a flowchart showing a focus control process.

The CPU 22 performs the focus control process in accordance with the flowchart shown in FIG. 13.

The CPU 22 obtains chart display information for focus control with reference to the table T1 stored in the ROM 20 (step S11).

The CPU 22 designates either one of the phase difference sensors 18$h$ and 18$v$, based on the chart display information (step S12).

The CPU 22 supplies the obtained chart display information for focus control to the chart generation circuit 13, to control the chart generation circuit 13 to generate a chart image signal for focus control (step S13).

The CPU 22 controls the superimposing circuit 14 to combine (superimpose) the chart image signal generated by the chart generation circuit 13 with the video signal output by the keystone correction circuit 12 (step S14).

The CPU 22 controls the display device 15 to convert the video signal output by the superimposing circuit 14 into a projection light and project it on the screen 2 (step S15).

The CPU 22 obtains sensor pixel data from the sensor unit 18 (step S16).

The CPU 22 determines whether the chart image comes within the viewable range of the phase difference sensor 18$h$ or 18$v$, based on the obtained sensor pixel data (step S17).

In a case where determining that the chart is not within the viewable range (step S17; No), the CPU 22 corrects the chart display information (step S18).

The CPU 22 stores the corrected chart display information in the RAM 21, and supplies it to the chart generation circuit 13 to control the chart display circuit 13 again to generate a chart image signal for focus control (step S19).

In a case where determining that the chart image comes within the viewable range (step S17; Yes), the CPU 22 obtains phase difference data from the sensor unit 18, and calculates the distance to the screen 2 based on the obtained phase difference data (step S20).

The CPU 22 supplies this distance information to the optical mechanics unit 17 to control it to adjust the position of the projection lens 16 (step S21).

The CPU 22 stores the distance information in the RAM 21 (step S22). Then, the CPU 22 terminates the focus control process.

Next, the keystone correction control process will be explained.

Figure 14:
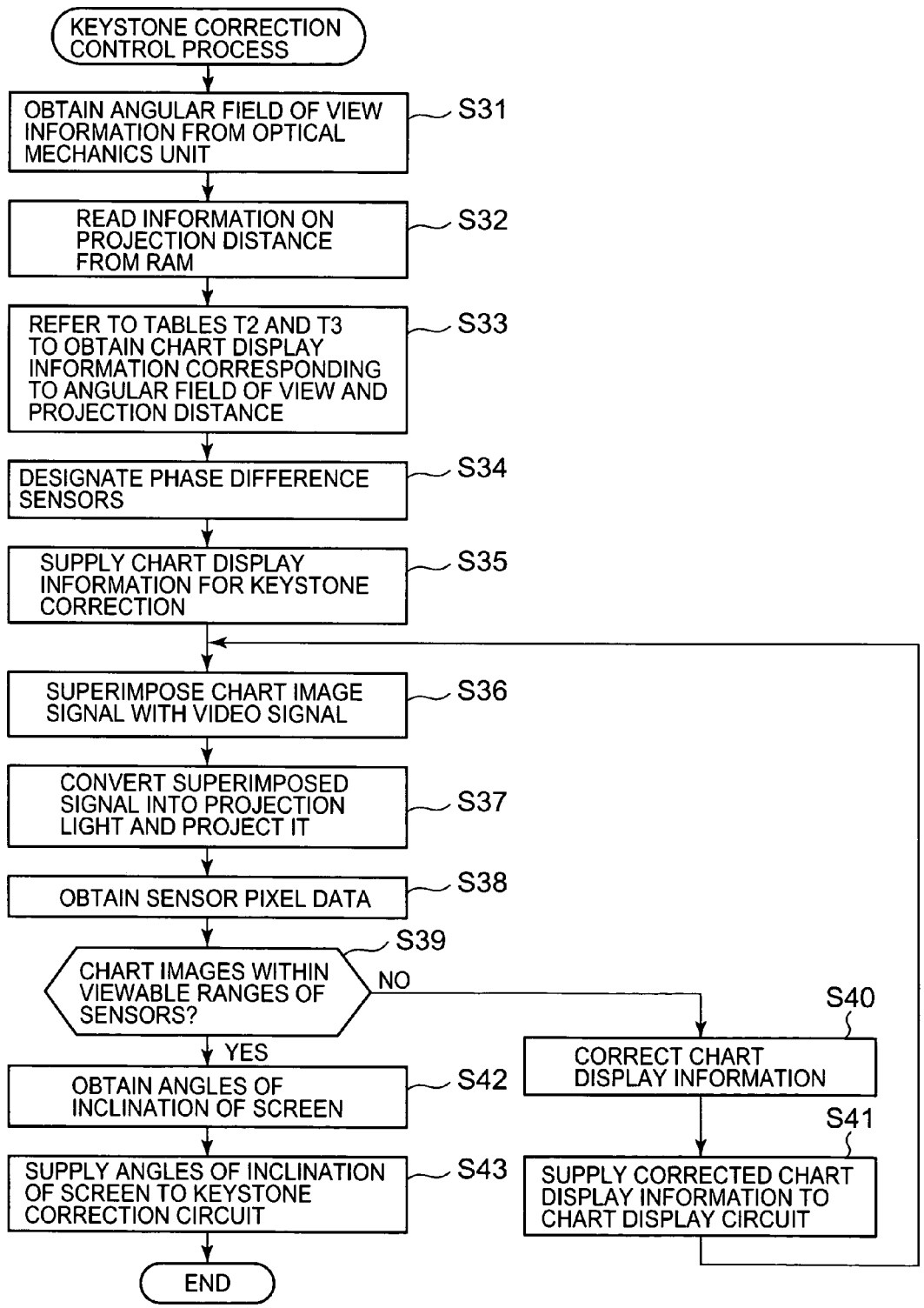
FIG. 14 is a flowchart showing a keystone correction control process.

The CPU 22 performs the keystone correction control at predetermined time intervals, or when the distance to the screen 2 changes due to shakes, etc., or when the user gives an instruction for this control by operating the operation unit 19. The CPU 22 performs the keystone correction control process in accordance with the flowchart shown in FIG. 14.

The CPU 22 obtains angular field of view information from the optical mechanics unit 17 (step S31).

The CPU 22 reads the distance information from the RAM 21 (step S32).

The CPU 22 obtains the display position and display size for both the horizontal chart image Hc and vertical chart image Vc that match the angular field of view and the distance, with reference to the tables T2 and T3 stored in the ROM 20 (step S33).

The CPU 22 designates the phase difference sensors 18$h$ and 18$v$ (step S34).

The CPU 22 supplies the chart display information for keystone correction to the chart generation circuit 13 to control the chart generation circuit 13 to generate a chart image signal for keystone correction (step S35).

The CPU 22 controls the superimposing circuit 14 to combine (superimpose) the chart image signal generated by the chart generation circuit 13 with the video signal output from the keystone correction circuit 12 (step S36).

The CPU 22 controls the display device 15 to convert the video signal output by the superimposing circuit 14 into a projection light, and project it on the screen 2 (step S37).

The CPU 22 obtains sensor pixel data from the sensor unit 18 (step S38).

The CPU 22 determines whether the chart images come within the viewable ranges of the phase difference sensors 18$h$ and 18$v$ based on the obtained sensor pixel data (step S39).

In a case where determining that the chart images do not come within the viewable ranges (step S39; No), the CPU 22 corrects the chart display information (step S40).

The CPU 22 stores the corrected chart display information in the RAM 21, and supplies it to the chart generation circuit 13 to again control the chart generation circuit 13 to generate a chart image signal for keystone correction (step S41).

In a case where determining that the chart images come within the viewable ranges (step S39; Yes), the CPU 22 obtains phase difference data from the sensor unit 18 and calculates the angles of inclination θh and θv of the screen 2 based on the obtained phase difference data (step S42).

The CPU 22 supplies the information on the angles of inclination θh and θv of the screen 2 to the keystone correction circuit 12 to control the keystone correction circuit 12 to perform keystone correction (step S43).

Next, specific examples of the focus control process and keystone correction control process will be explained.

In the focus control process, the CPU 22 refers to the table T1 shown in FIG. 9A, and supplies chart display information for focus control to the chart generation circuit 13 (steps S11 to S13 of FIG. 13). For example, the chart generation circuit 13 generates a chart image as shown in FIG. 12.

The CPU 22 performs steps S14 to S15. That is, the superimposing circuit 14 combines (superimposes) the horizontal chart image Hc or vertical chart image Vc generated by the chart generation circuit 13 with the video signal output from the keystone correction circuit 12. The display device 15 converts the video signal into a projection light and projects the video on the screen 2.

The phase difference sensor 18$h$, whose viewable range meets the display position and display size of the chart image, receives a light from the chart image and obtains phase difference data. The CPU 22 obtains this phase difference data and calculates the distance to the screen 2. The CPU 22 supplies the calculated distance information to the optical mechanics unit 17 to perform focus control, and stores the distance information in the RAM 21 (steps S16 to S22).

Next, in the keystone correction control process, the CPU 22 refers to the table T1 shown in FIG. 9A to obtain chart display information for keystone correction. For example, in a case where the CPU 22 obtains angular field of view information from the optical mechanics unit 17 that indicates that the angular field of view is α_wide (large angular field of view), it obtains chart display information for keystone correction that matches the angular field of view of α_wide, with reference to the table T2 shown in FIG. 9B. Then, the CPU 22 supplies this chart display information to the chart generation circuit 13 (steps S31 to S35 of FIG. 14).

Figure 15A:
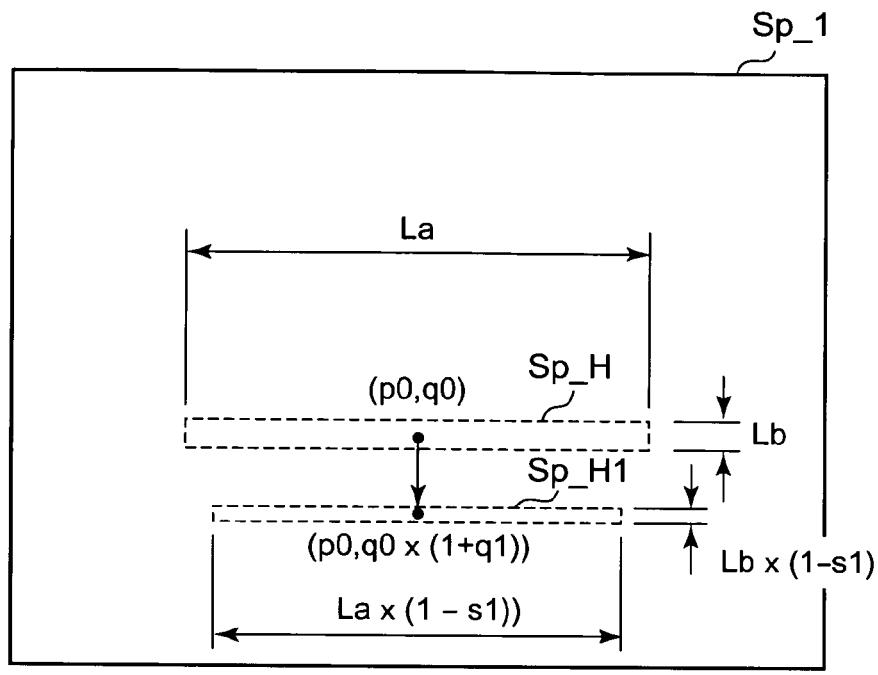
FIG. 15A and FIG. 15B are diagrams showing specific examples of the display position and display size of the chart image.
Figure 15B:
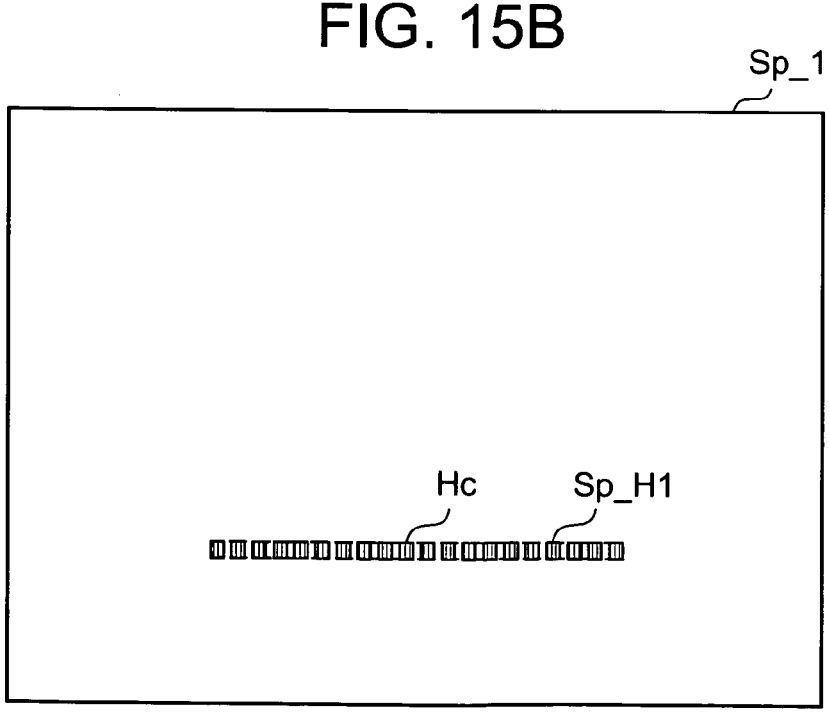

For example, assume that in case of the angular field of view being α_mid (middle angular field of view), the coordinates of the display position of the horizontal chart image Hc are (p0, q0), and the display size thereof is a length La in the horizontal dimension and a length Lb in the vertical dimension, as shown in FIG. 15A. The chart generation circuit 13 sets the coordinates of the display position in case of the angular field of view being a wide to (p0, q0×(1+q1)), and the display size to (La×(1−s1)) in the horizontal dimension, and (Lb×(1−s1)) in the vertical dimension, based on the chart display information supplied from the CPU 22.

Further, in case of the distance to the screen 2 being L_near (near distance), the CPU 22 refers to the table T3 shown in FIG. 9C to supply chart display information that matches the distance L_near to the chart generation circuit 13.

The chart generation circuit 13 sets the coordinates of the display position in case of the distance being L_near to (p0×(1−p4), q0×(1+q1)×(1−q4)), and the display size to La×(1−s1) in the horizontal dimension, and Lb×(1−s1) in the vertical dimension, based on the chart display information supplied from the CPU 22.

The CPU 22 performs steps S36 to S43. That is, the superimposing circuit 14 combines (superimposes) the horizontal chart image Hc and vertical chart image Vc generated by the chart generation circuit 13 with the video signal output by the keystone correction circuit 12. Then, the display device 15 converts this video signal into a projection light and projects the video on the screen 2.

The phase difference sensors 18$h$ and 18$v$ receive a light from the chart image in the viewable ranges which meet the display position and display size of the chart image, and obtain phase difference data on the screen 2 in the horizontal direction and vertical direction.

The CPU 22 obtains the phase difference data and calculates the distance to the screen 2. Further, the CPU 22 calculates the angles of inclination θh and θv, and supplies the calculated angles of inclination θh and θv to the keystone correction circuit 12. The keystone correction circuit 12 performs keystone correction based on the angles of inclination θh and θv supplied from the CPU 22.

As explained above, according to the present embodiment, the projector 1 pre-stores chart display information matching the viewable ranges of the sensor unit 18, and projects the chart images having the matching display size at the display positions matching the viewable ranges of the sensor unit 18.

Accordingly, the projector 1 can project the chart images by reducing the display size thereof, and can superimpose the video and the chart images without giving the user a significant strange feeling that might cause any trouble.

Since the chart images can be superimposed on the video without causing any trouble, it is possible to perform focus control and keystone correction immediately when the distance between the projector 1 and the screen 2 changes, or at predetermined time intervals. Therefore, focus control and keystone correction can be completely automated, making it possible to always project a vivid undistorted video on the screen 2.

Various modifications may be conceivable for carrying out the present invention, and the present invention is not thus limited to the above-described embodiment.

Figure 16A:
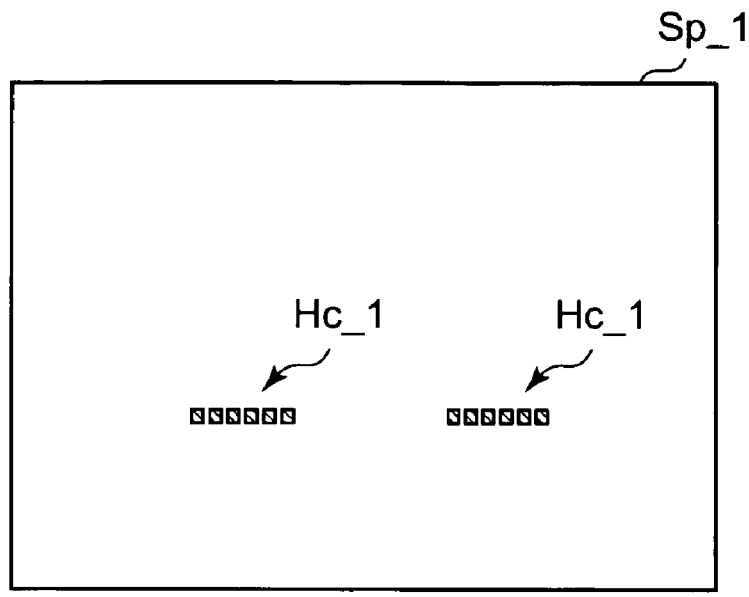
FIG. 16A and FIG. 16B are diagrams showing examples of chart projected on a screen, where
Figure 16B:
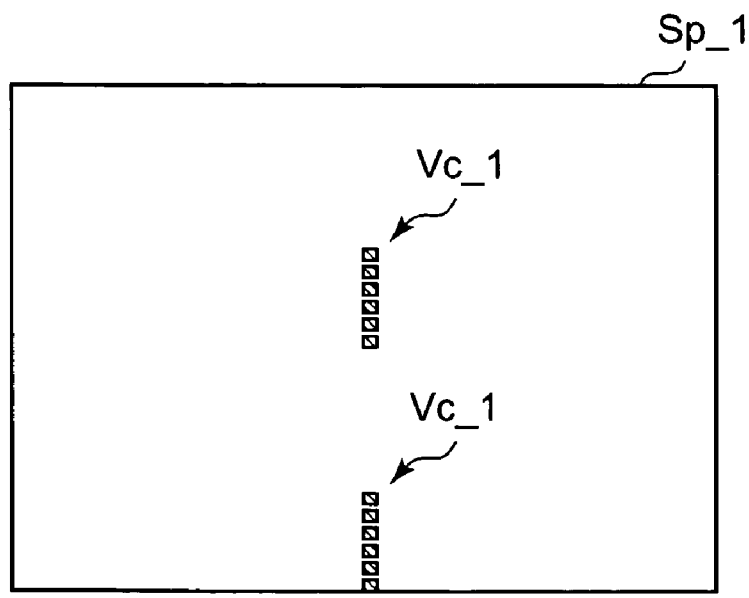

For example, the chart images to be projected on the screen 2 are not limited to those described in the above-described embodiment. For example, a horizontal chart image Hc_1 as shown in FIG. 16A and a vertical chart image Vc_1 as shown in FIG. 16B may be used as the charts for keystone correction.

The horizontal chart image Hc_1 and vertical chart image Vc_1 are equivalent to the horizontal chart image Hc and vertical chart image Vc without the central portion thereof, respectively. In the keystone correction, it is possible to obtain the angles of inclination θh or θv if the distance to two points on the screen 2 that are lined in the left and right direction or in the upward and downward direction can be obtained. Thus, the chart images can be more downsized, if the horizontal chart image Hc_1 and vertical chart image Vc_1 are used for keystone correction.

Figure 17:
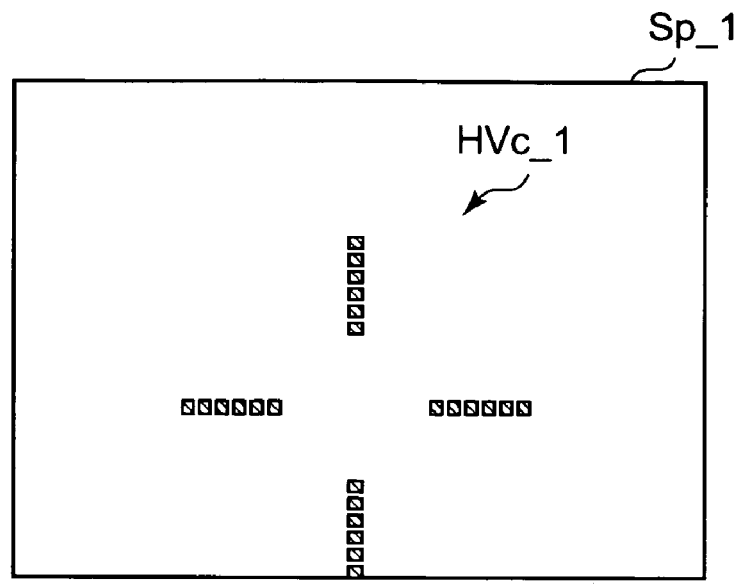
FIG. 17 is a diagram showing an example of a chart image for keystone correction, for both horizontal and vertical directions.

A chart image HVc_1 as shown in FIG. 17 may be used as the chart image for keystone correction as well. The chart image HVc_1 is the combined version of the horizontal chart image Hc_1 and vertical chart image Vc_1. By using the chart image HVc_1 as the chart image for keystone correction, it is possible to measure the distance to two points on the screen 2 in the horizontal direction and the distance to two points on the screen 2 in the vertical direction simultaneously, and thereby to shorten the time required for the measurement.

Figure 18:
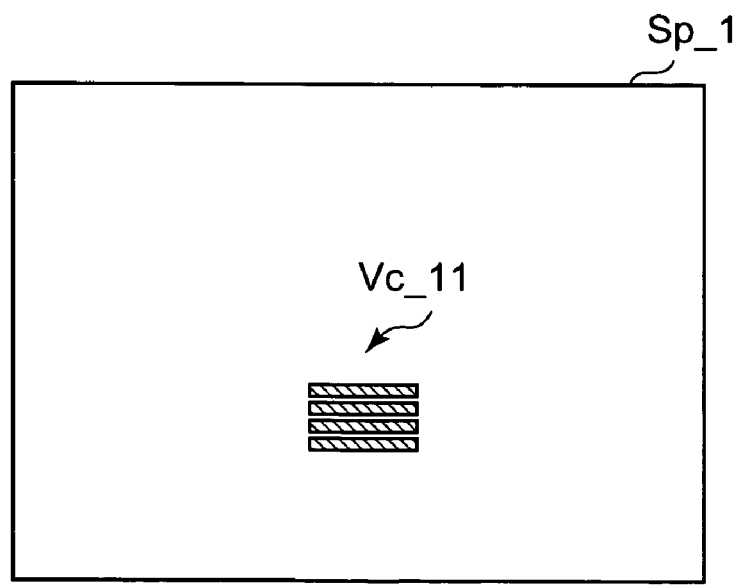
FIG. 18 is a diagram showing an example of a chart image for focus control.

Furthermore, a vertical chart image Vc_11 as shown in FIG. 18 may be used as the chart image for focus control. In this case, the CPU 22 employs the phase difference sensor 18v as the sensor for obtaining phase difference sensor.

In a case where the vertical chart image Vc_11 shown in FIG. 18 is used as the chart for focus control, the vertical chart image Vc_11 can be displayed so as to positionally correspond to the central portion of the phase difference sensor 18v, at the respective angular fields of view of α_wide, α_mid, and α_tele, as shown in FIG. 19A, FIG. 19B, and FIG. 19C. Further, the vertical chart image Vc_11 can also be displayed at the central portion of the projected video at the respective angular fields of view of α_wide, α_mid, and α_tele, as shown in FIG. 20A, FIG. 20B, and FIG. 20C.

Figure 20C:
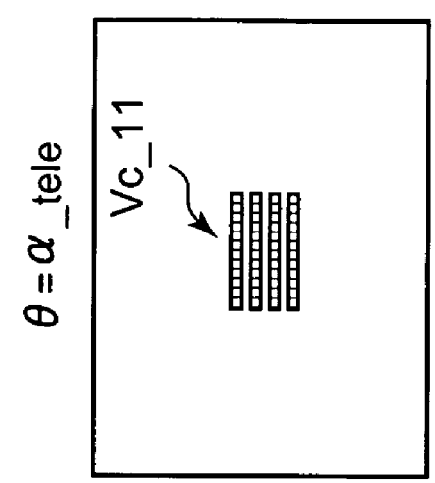
FIG. 20A, FIG. 20B, and FIG. 20C are diagrams showing the relationships between the angular field of view, and the display position and display size, in a case where the vertical chart image shown in FIG. 18 is used.
Figure 20B:
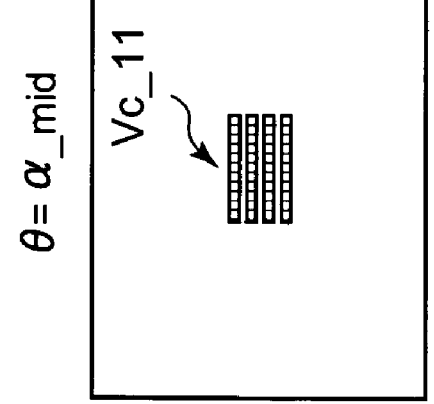
Figure 20A:
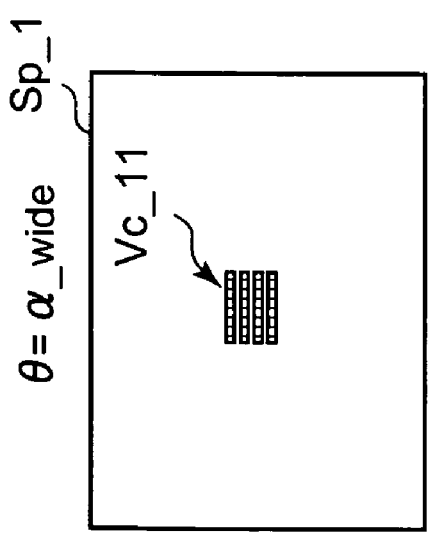

In the case where the vertical chart image Vc_11 is displayed as shown in FIG. 20A to FIG. 20C, the wider the angular field of view is, the higher portion of the phase difference sensor 18v is used to measure the distance to the screen 2. This keeps the phase difference sensor 18v on duty all the time for measuring the distance to the central portion of the projected video, contributing to improving the accuracy of focus control.

In the above-described embodiment, the angular field of view and the distance are categorized into three ranges, respectively. However, the present invention is not limited to this, but the angular field of view and the distance may be categorized into four or more ranges, so that the display position and display size of the chart image may be finely set.

In the above-described embodiment, the programs are pre-stored in the corresponding memories, etc., as described above. However, programs for controlling a projector to operate as the whole apparatus or a part of the apparatus or to perform the above-described processes may be stored and distributed in a computer-readable recording medium such as a CD-ROM (Compact Disk-Read Only Memory), a DVD (Digital Versatile Disk), an MO (Magneto Optical disk), etc., and then installed on another computer to control the computer to function as the above-described units or perform the above-described processes.

Furthermore, the programs may be stored in a disk device, etc. of a server apparatus on the Internet, so that the programs may be embedded in a carrier wave to be downloaded on a computer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-38262 filed on Feb. 15, 2005 and including specification, claims, drawings and summary. The disclosure of the above Japanese Patent Application is incorporated herein by reference in its entirety.

What is claimed is:

1. An image display apparatus for projecting a video on a projection plane, comprising:

a chart image signal generation unit which is supplied with chart display information designating a display position and a display size, on the projection plane, of a chart image for measuring a distance to the projection plane, and which generates a chart image signal in which the display position and the display size of the chart image are set based on the supplied chart display information;

a projection unit which converts the chart image signal generated by the chart image signal generation unit into projection light to project the chart image as a part of a projection video on the projection plane based on the display position and the display size designated by the chart display information supplied to the chart image signal generation unit;

a sensor unit which receives light from the chart image projected as part of the projection video on the projection plane, and which obtains sensor data regarding the distance to the projection plane based on an image imaged on an imaging surface thereof; and a chart display information supply unit which determines a viewable range of the sensor unit, sets the display position and the display size of the chart image on the projection plane based on the determined viewable range of the sensor unit, and supplies the chart display information designating the set display position and display size to the chart image signal generation unit.

2. The image display apparatus according to claim 1, further comprising:
an angular field of view information obtaining unit which obtains angular field of view information regarding an angular field of view of the projection video projected by the projection unit,
wherein the chart display information supply unit sets the display position and the display size of the chart image, based on the viewable range of the sensor unit within the projection plane and the angular field of view information obtained by the angular field of view information obtaining unit.

3. The image display apparatus according to claim 2, further comprising:
a storage unit which stores relational information which specifies a relationship between the angular field of view information regarding the angular field of view of the projection video projected by the projection unit within the viewable range of the sensor unit within the projection plane, and the display position and the display size of the chart image,
wherein the chart display information supply unit sets the display position and the display size of the chart image based on the relational information stored in the storage unit and the angular field of view information obtained by the angular field of view information obtaining unit.

4. The image display apparatus according to claim 1, further comprising:
a distance obtaining unit which obtains the distance to the projection plane based on the sensor data obtained by the sensor unit,
wherein the chart display information supply unit sets the display position and the display size of the chart image on the projection plane, based on the viewable range of the sensor unit within the projection plane and the distance to the projection plane obtained by the distance obtaining unit.

5. The image display apparatus according to claim 4, further comprising:
a storage unit which stores relational information which specifies a relationship between a distance to the projection plane within the viewable range of the sensor unit within the projection plane, and the display position and the display size of the chart image,
wherein the chart display information supply unit sets the display position and the display size of the chart image based on the relational information stored in the storage unit and the distance to the projection plane obtained by the distance obtaining unit.

6. The image display apparatus according to claim 1, further comprising:
a chart display information storage unit which stores information representing a display position and a display size of the chart image which are set beforehand within the viewable range of the sensor unit,
wherein the chart display information supply unit obtains the information stored in the chart display-information storage unit, and supplies the chart display information based on the obtained information, to the chart image signal generation unit.

7. The image display apparatus according to claim 6, wherein the chart display information supply unit sets the display position and the display size of the chart image, based on the viewable range of the sensor unit, the viewable range including an assembling error of the projection unit, and an error of the viewable range of the sensor unit.

8. The image display apparatus according to claim 1, further comprising:
a video obtaining unit which obtains a video; and
a video signal supply unit which supplies the projection unit with a video signal which is obtained by superimposing the chart image generated by the chart image signal generation unit with the video obtained by the video obtaining unit,
wherein the projection unit projects the video signal supplied from the video signal supply unit as the projection video on the projection plane; and
wherein the sensor unit receives light from the projection video projected by the projection unit to obtain the sensor data regarding the distance to the projection plane.

9. The image display apparatus according to claim 8, further comprising a first processing unit which brings the projection video projected by the projection unit into focus, and wherein:
the chart image signal generation unit generates a first chart image used for bringing the projection video projected by the projection unit into focus;
the video signal supply unit supplies the projection unit with a video signal obtained by superimposing the first chart image with the video obtained by the video obtaining unit;
the sensor unit receives reflection light from the first chart image included in the video obtained by the video obtaining unit, to obtain first sensor data regarding the distance to the projection plane; and
the first processing unit brings the projection video projected by the projection unit into focus, based on the first sensor data obtained by the sensor unit.

10. The image display apparatus according to claim 9, further comprising a second processing unit which corrects a distortion of the video projected by the projection unit, and wherein:
the chart image signal generation unit generates a second chart image used for correcting the distortion of the projection video projected by the projection unit;
the video signal supply unit supplies the projection unit with a video signal obtained by superimposing the first chart image, the second chart image, and the video obtained by the video obtaining unit;
the sensor unit receives reflection light from the second chart image included in the video obtained by the video obtaining unit, to obtain second sensor data regarding the distance to the projection plane; and
the second processing unit corrects the distortion of the projection video projected by the projection unit.

11. The image display apparatus according to claim 8, wherein the sensor unit obtains first reflection light reflected from the projection video projected by the projection unit and received at a predetermined first position, and second reflection light reflected from the projection video projected by the projection unit and received at a second position different from the first position, and obtains the sensor data regarding the distance to the projection plane based on a phase difference between the first reflection light and the second reflection light.

12. An image display method for displaying a chart image to be projected for measuring a distance to a projection plane on which a projection video is projected, said image display method comprising:
determining a viewable range of a sensor unit which receives light from the projection plane for measuring the distance to the projection plane;

setting a display position and a display size of the chart image so that the chart image comes within the determined viewable range; and projecting the chart image as a part of the projection video on the projection plane based on the set display position and the set display size.

13. A recording medium storing a program for controlling a computer to execute functions comprising:

determining a viewable range of a sensor unit which receives light from a projection plane for measuring a distance to the projection plane on which a projection video is projected;

setting a display position and a display size of a chart image to be projected for measuring the distance to the projection plane, so that the chart image comes within the determined viewable range; and projecting the chart image as a part of the projection video on the projection plane based on the display position and the set display size.

* * * * *